J. F. COLLINS.
SHOE TREE.
APPLICATION FILED AUG. 9, 1915.
1,193,875.
Patented Aug. 8, 1916.
2 SHEETS—SHEET 1.
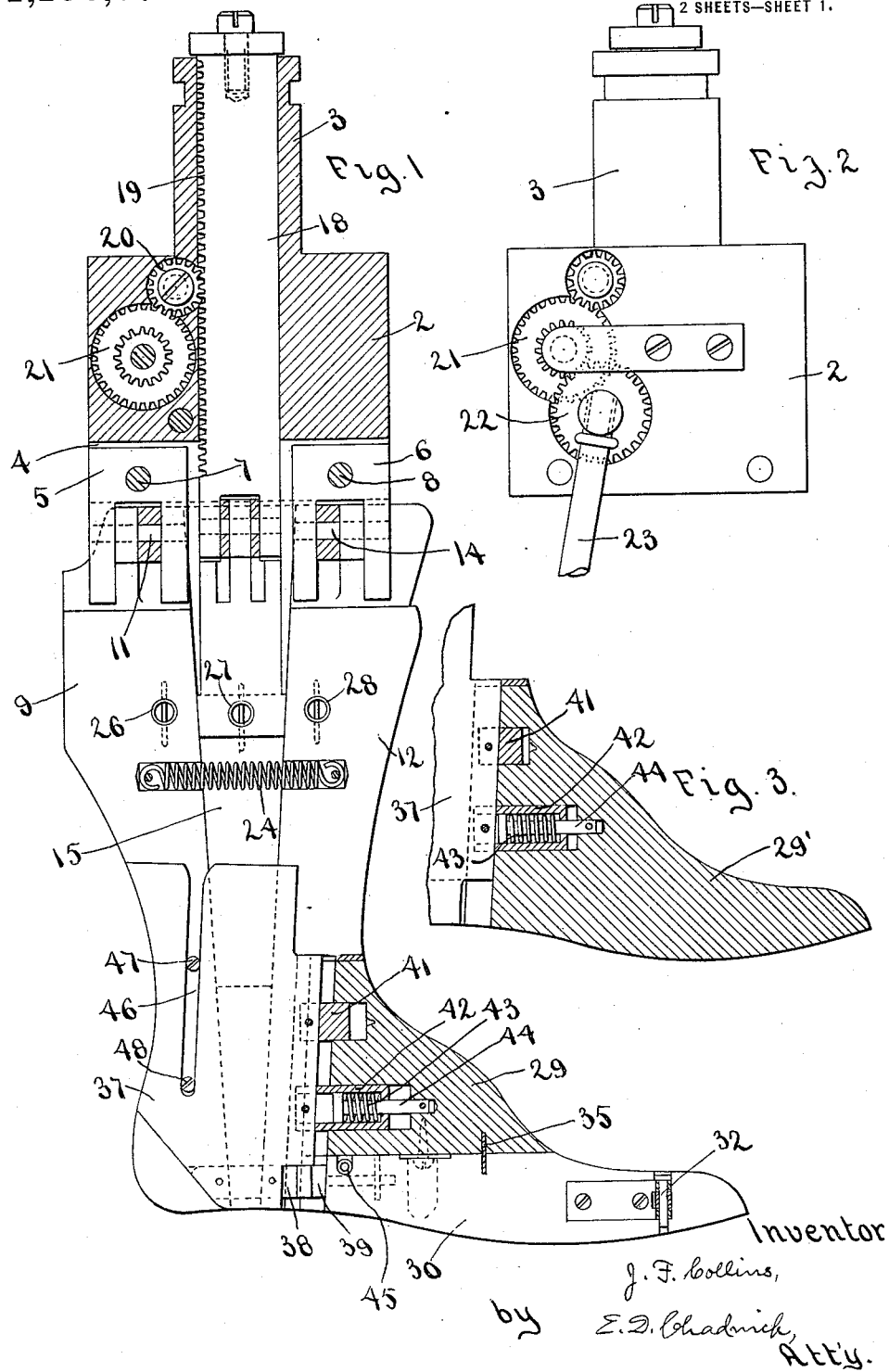
Inventor
J. F. Collins,
by E. D. Chadwick,
Att'y.

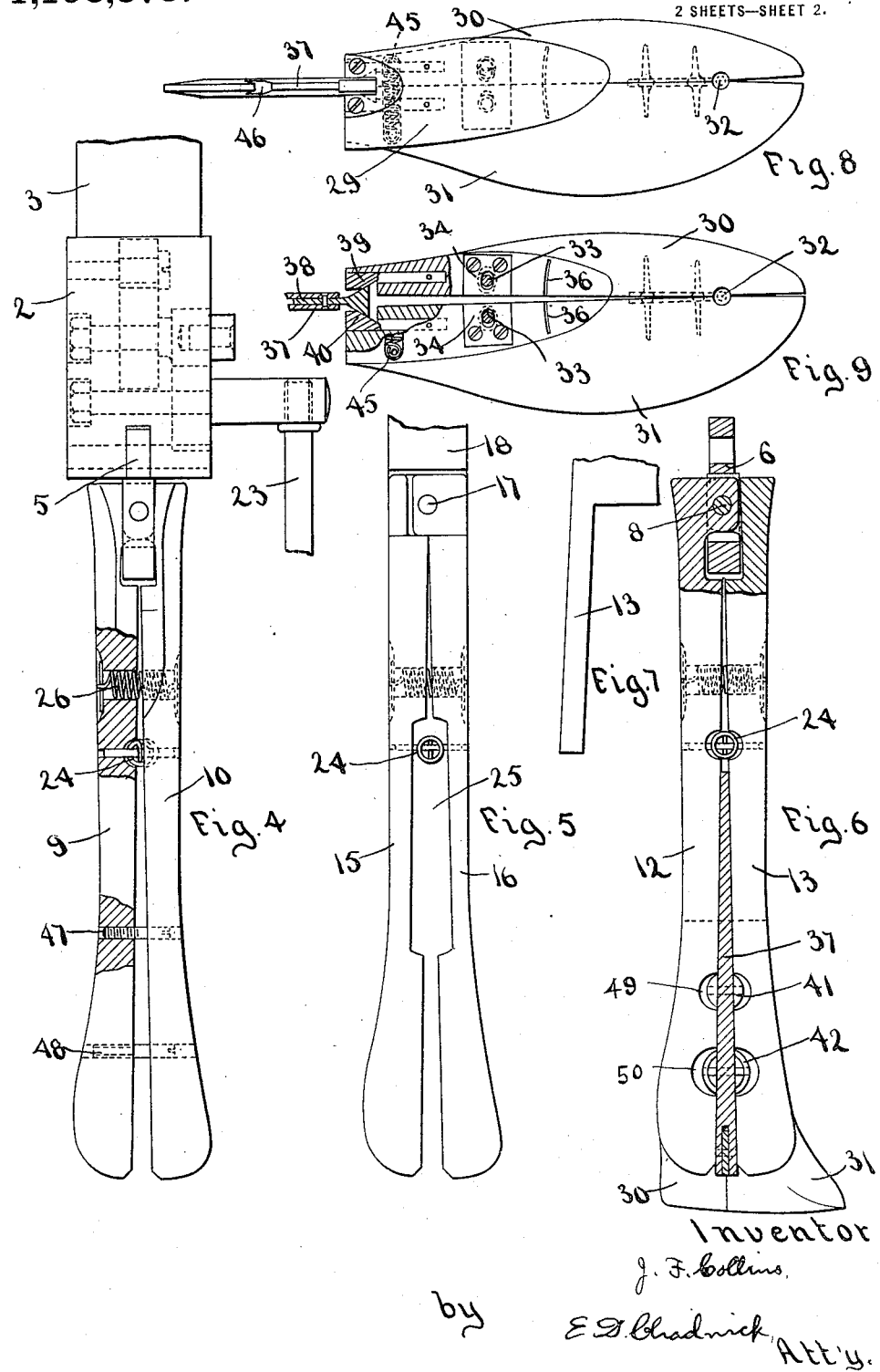

UNITED STATES PATENT OFFICE.

JEREMIAH F. COLLINS, OF BROCKTON, MASSACHUSETTS.

SHOE-TREE.

1,193,875.  Specification of Letters Patent.  Patented Aug. 8, 1916.

Application filed August 9, 1915. Serial No. 44,387.

*To all whom it may concern:*

Be it known that I, JEREMIAH F. COLLINS, a citizen of the United States, residing at Brockton, in the county of Plymouth and State of Massachusetts, have invented new and useful Improvements in Shoe-Trees, of which the following is a specification.

This invention relates to trees of the character used in the manufacture of boots and shoes, and is particularly intended to provide a tree which can be more completely and effectively expanded and contracted than those heretofore employed, and which when expanded will present a smooth and practically unbroken exterior surface throughout the areas which are covered by the soft parts of a shoe, so that the tree can be used for both treeing and ironing with the most satisfactory results. This and other objects of my invention are accomplished by the construction hereinafter described in connection with the accompanying drawings, in which,—

Figure 1 is mainly a central vertical section through the tree as preferably constructed, with certain parts shown in side elevation; Fig. 2 is a side elevation of the body portion which carries the tree leg; Fig. 3 is a detail view showing another form of tree foot in central longitudinal section; Fig. 4 is a rear elevation, partly in section, showing the back portion of the tree leg; Fig. 5 is a rear elevation of the intermediate portion of the tree leg, which serves also as an expander; Fig. 6 shows the front portion of the tree leg and attached foot in rear elevation, with certain parts shown in section; Fig. 7 is a partial side elevation of the front portion of the tree leg; Fig. 8 is a top plan view of the tree foot illustrated in Fig. 1; and Fig. 9 is a similar view of the lower portion of said foot, shown partly in section.

The complete tree illustrated in Fig. 1, which shows all the parts assembled and in their expanded position, comprises in general a body portion, a tree leg which is expansible and contractible in the direction of the length of the foot and includes front and back portions, each of which is laterally expansible and contractible, an intermediate portion which is also laterally expansible and contractible and serves as an expander for separating the front and back portions, and a detachable tree foot which carries a lateral expander for the three main portions of the tree leg, the lower portion of said foot being also laterally expansible and contractible. All of the parts above referred to are preferably made of metal with the exception of the foot, which is usually constructed mainly of wood but includes certain metallic attachments.

In the specific construction illustrated the body portion 2 has at one end a cylindrical stem 3 adapted to be inserted into and rotatably held within a journal or socket in a tree stand or pedestal in the usual manner. This stand is not shown, as it may be of any suitable construction. At its opposite end the body portion 2 is provided with a slot 4 extending from front to back, and within this slot are located two plates 5 and 6 which are mounted on transverse pivot pins 7 and 8 and carry respectively the front and back portions of the tree leg, whereby provision is made for expansion and contraction of the leg as a whole in the direction of the length of the foot.

The back portion of the tree leg consists of two similar parts or halves 9 and 10 located side by side and each pivoted at its upper end on a pin 11 carried by the plate 5 and extending at right angles to the pin 7, so that the parts 9 and 10 are capable of lateral movement toward and away from each other. The front portion of the tree leg also consists of two similar parts or halves 12 and 13 located side by side and each pivoted at its upper end on a pin 14 carried by the plate 6 and extending in the same direction as the pin 11, in line therewith, so that the parts 12 and 13 are likewise capable of lateral movement toward and away from each other. In like manner the intermediate portion of the tree leg consists of two similar parts or halves 15 and 16 hinged at their upper ends on a pin 17 carried by a slidable rod 18 and movable toward and away from each other.

As viewed from the side of the tree the parts 15 and 16 are located between the front and back portions of the leg and are tapered downwardly, the inner faces of said front and back portions being slanted in conformity with the adjacent faces of the parts 15 and 16. The latter parts thus constitute a wedge for expanding the tree leg in the direction of the length of the foot, and they are caused to exert their wedging action by power applied to the rod 18, which slides longitudinally in the body portion 2 and may be operated in any suitable way. In the construction illustrated this rod is provided on one side with a rack 19 meshing with a pinion 20 journaled in the body portion and connected through a train of gears 21 and 22 to an operating handle 23.

A spring 24 connecting the front and back portions of the tree leg and passing through an open space 25 left between the parts 15 and 16, as shown in Fig. 5, draws said front and back portions together whenever such movement is permitted by the upward movement of said parts 15 and 16. The two parts of each of the three main portions of the tree leg are also connected by springs 26, 27 and 28 respectively, which tend to draw said parts together laterally, all of said springs being located wholly within the parts which they connect, so that the external surfaces of these parts are left smooth and free from projections.

When the parts 15 and 16 are moved downward to the fullest extent their lower ends are located in line with the lower ends of the parts 9 and 10 and also in line with the lower ends of the rear portions of the parts 12 and 13. In the front of said rear portions the latter parts are cut away as shown in Fig. 7 to receive the detachable foot portion of the tree, which in the form shown in Fig. 1 comprises an upper section 29 and two lower sections 30 and 31. The upper section 29 has a flat bottom face which is preferably located substantially at the line of the vamp seam of a shoe, and the two lower sections 30 and 31 are hinged together by a vertical pin 32 located in the toe portion of the foot, being thus capable of lateral movement toward and away from each other at their rear ends. The flat upper faces of these two lower sections rest against the bottom face of the upper section 29 and are secured thereto by headed screws 33, each passing through a laterally-slotted plate 34 secured to the top of one of the lower sections, as shown in Figs. 1 and 9. The slots in said plates provide for the lateral movements of the lower sections, and in order to furnish an additional guide for said sections during their lateral movements, and also to prevent any longitudinal displacement of the same, I prefer to insert in the under side of the upper section 29 a thin plate 35 which is curved from the pin 32 as a center and extends vertically downward into slots 36 in the top of the sections 30 and 31.

The tree foot above described carries a vertical plate 37 which is connected to the upper section 29 of the foot and is located in such position as to enter between the two halves of each of the three main tree-leg portions from the lower ends of the latter, which are preferably beveled adjacent to their inner faces as shown in Figs. 4, 5 and 6, to facilitate the entrance of the plate. Said plate is tapered upwardly from side to side to form a wedge, so that it acts as a lateral expander for the tree-leg portions when inserted therein. It also carries an expander 38 for the two lower sections 30 and 31 of the tree foot, said expander having a wedge-shaped front end which is located between metallic inserts 39 and 40 carried respectively by the sections 30 and 31 at their rear ends. This expander is operated by a rearward movement of the plate 37 with reference to said foot sections, such movement being provided for by attaching said plate to the rear ends of two studs 41 and 42 entering the rear side of the upper foot section 29 and adapted to slide horizontally therein. One of said studs is made hollow to receive a compression spring 43 located between the front end of the stud and the headed rear end of a pin 44 connected at its front end to the section 29, which spring tends to draw the plate 37 forward and thereby leave the foot sections 30 and 31 free to be drawn together by a laterally-extending spring 45, set into the tops of said sections and connecting the same. For causing said plate 37 to move in the opposite direction and thereby expand said foot sections, I provide the plate with a vertical slot 46 located near its rear edge and adapted to receive two transversely-extending pins 47 and 48 carried by one of the sections 9 and 10 and extending across the space between the latter. The result of this arrangement is that when the plate 37 is fully inserted into the tree leg and the parts 15 and 16 are forced downward, resulting in a relative rearward movement of the rear portion of the tree leg, said rear portion moves the plate 37 with it and thus withdraws it from the foot section of the tree against the pressure of the spring 43, thereby causing the expander 38 to operate on the lower sections 30 and 31 of the tree foot. When the plate 37 moves rearward the rear ends of the studs 41 and 42 enter apertures 49 and 50 formed in the front portion of the tree leg, as shown in Fig. 6, thereby positively locking the foot to the leg and preventing its detachment until after the parts have been collapsed.

It will be seen from the foregoing description that an upward movement of the rod 18 will result in collapsing the tree leg in the forward and backward direction, at the same time leaving the two lower sections of the foot free to be laterally collapsed by the spring 45, and will also unlock the foot from the leg by withdrawing the studs 41 and 42 from the apertures 49 and 50. The foot can then be partially or completely withdrawn from the leg, it being completely withdrawn only when it has to be replaced by a different one. When a shoe is to be applied the foot is withdrawn until the tree leg is sufficiently collapsed laterally by the springs 26, 27 and 28, which draw together the members connected thereby as fast as such movement is permitted by the downward movement of the wedge plate 37, and then the foot and leg are inserted into the shoe while the foot remains partially withdrawn, from the leg. After this has been done the foot is pushed into place, thereby causing the three tree leg portions to be expanded laterally by the action of the plate 37 as it enters between them, and then the rod 18 is forced downward until the intermediate portion of the tree leg reaches the sole of the shoe, whereby the tree is expanded forwardly and backwardly and the lower foot sections are expanded laterally by the action of the wedge plate 37 and the expander 38 thereon. This causes the parts to fill the shoe, and thereupon the treeing and ironing operations can be performed in the usual manner. The combined parts of the construction described are readily given an external contour such that when they are in the expanded position they conform to and make a tight fit with the interior of the shoe and provide a practically continuous and unbroken external surface throughout, thus not only avoiding the presence of gaps in the surface which supports the shoe parts during treeing and ironing but also avoiding the use of the customary plates for covering such gaps.

It will be understood that the use of the tree for different styles and sizes of shoes requires the employment of a large number of detachable foot portions of correspondingly different sizes and contours, and it is an important feature of my invention that it enables a grading system to be employed whereby a relatively small number of different wedge plates 37 may be made to suffice for the various sizes and shapes of the foot portions. This is due to the fact that a given wedge plate, such for example as is suitable for a tree foot corresponding to size 4 and width C of a given style, is also adapted for use with a tree foot corresponding to size 6, width A, or to size 5, width B, or to size 3, width D, or to size 2, width E, of a shoe of the same style, the same relation being found to exist with respect to the other usual sizes in the various widths.

In the foregoing description the location and direction of movement of various parts have been explained with reference to a vertical position of the tree, as illustrated in the drawings, but it will be understood that in actual use the tree ordinarily extends horizontally from the tree stand, or substantially so.

While the tree construction above described is collapsible and expansible in two directions and with respect to all the parts which are likely to bind in applying and removing a shoe, it may suffice in some cases to provide a less degree of collapsibility, especially in a lateral direction. For example, in place of laterally-expansible tree foot such as is shown in Fig. 1 a solid or one-piece foot may be employed, a foot of the latter character being shown at 29' in Fig. 3. In the case of a solid foot the capacity for rearward movement of the plate 37 which it carries will be of no functional importance as regards lateral expansion, and the expander 38 may therefore be omitted, but such capacity is preferably retained in order that the rear edge of said plate may remain flush with the rear edges of the parts 9 and 10 when the tree leg is expanded in the forward and backward direction. As regards lateral expansion of the different portions of the tree leg, this may obviously be modified as desired by appropriately shaping the corresponding portions of the plate 37 and the parts between which it passes.

Various other modifications in the parts employed and in the details of their construction and arrangement may be made without departing from my invention, and the laterally-expansible foot construction may also be used for other forms of shoe trees and analogous devices.

I claim:

1. A shoe tree comprising a leg having laterally-expansible front and back portions arranged for relative movement in the direction of the length of the foot, and means for expanding said leg in both directions.

2. A shoe tree comprising a leg having laterally-expansible front and back portions and an intermediate portion which is also laterally-expansible and serves as an expander for the leg in the direction of the length of the foot, and means for expanding said leg portions laterally.

3. A shoe tree comprising a laterally-expansible leg, a detachable foot, and means carried by the foot for laterally expanding the leg.

4. A shoe tree comprising a laterally-expansible leg, a laterally-expansible foot, and means for expanding said leg and foot.

5. In a shoe tree, a foot comprising longitudinally-extending lower sections constituting collectively the entire lower portion of the foot and pivotally connected to each other near their front ends, an upper section overhanging the rear portions of said lower sections in sliding engagement therewith, and means for laterally expanding said lower sections.

6. In a shoe tree, a foot comprising longitudinally-extending lower sections constituting collectively the entire lower portion of the foot and pivotally connected to each other near their front ends, an upper section overhanging the rear portions of said lower sections and connected thereto by means providing for relative lateral movement thereof, and means for laterally expanding said lower sections.

7. In a shoe tree, a foot comprising an upper section having its bottom face located approximately at the line of the vamp seam of a shoe, and two longitudinally-extending lower sections carried thereby and constituting collectively the entire lower portion of the foot, said lower sections being pivotally connected to each other near their front ends, and means for laterally expanding said lower sections.

8. In a shoe tree, a laterally-expansible foot, a plate carried thereby and movable rearwardly with relation to the foot, and means operative with such movement for expanding the foot.

9. In a shoe tree, a foot comprising an upper section, laterally-expansible lower sections connected thereto, a plate carried by the upper section and movable rearwardly with respect to the same, and means carried by said plate for expanding said lower sections when the plate moves rearwardly.

10. A shoe tree comprising a leg having front and back portions arranged for separation in the direction of the length of the foot, a laterally-expansible foot, a plate carried thereby and movable rearwardly with respect to the same, means carried by said plate for expanding the foot, and connections between the plate and the rear portion of the leg for moving said plate rearwardly when the front and back portions of said leg are separated.

11. A shoe tree comprising a leg having front and back portions arranged for separation in the direction of the length of the foot, a detachable foot, a plate carried thereby and movable rearwardly with respect to the same, the rear edge of said plate being extended to and shaped in conformity with the rear face of the leg, and connections between said plate and the back portion of the leg for moving the plate rearwardly when the front and back portions of said leg are separated.

12. A shoe tree comprising a leg having front and back portions arranged for separation in the direction of the length of the foot, a detachable foot, a plate carried thereby and movable rearwardly with respect to the same, said plate being provided with a slot which is open at its upper end, and pins carried by the rear portion of the leg and passing laterally through said slot for moving the plate rearwardly when the front and back portions of said leg are separated.

13. A shoe tree comprising a leg portion having two parts which are movable laterally toward and away from each other, and a foot provided with a wedged-shaped plate adapted to enter between the parts of the leg portion and thereby expand the latter.

14. A shoe tree comprising a leg having laterally-expansible front and back portions arranged for relative movement in the direction of the length of the foot, a detachable foot, and means carried thereby for laterally expanding said leg portions.

15. A shoe tree comprising a leg having laterally-expansible front and back portions and an intermediate portion which is also laterally expansible and serves as an expander for the leg in the direction of the length of the foot, a detachable foot, and means carried thereby for laterally expanding the leg portions.

16. A shoe tree comprising a leg which is expansible in the direction of the length of the foot, means for expanding the same, a foot including longitudinally-extending lower sections constituting collectively the entire lower portion of the foot and pivotally connected to each other near their front ends, and an upper section overhanging the rear portions of said lower sections and connected thereto by means providing for relative lateral movement thereof, and means operated by the expansion of the leg for laterally expanding the lower sections of the foot.

17. A shoe tree comprising a leg which is expansible both laterally and also in the direction of the length of the foot, means for expanding the same in the latter direction, a laterally-expansible foot, means carried thereby for laterally expanding the leg, and means operated by the expansion of the leg in the direction of the length of the foot for laterally expanding said foot.

18. A shoe tree comprising front and back portions arranged for separation in the direction of the length of the foot, a wedge-shaped intermediate portion for separating said front and back portions, each of said leg portions having two parts which are movable laterally toward and away from each other, and a foot provided with a wedge-shaped plate adapted to enter between the parts of the leg portions and thereby expand the same.

19. A shoe tree comprising front and back portions arranged for separation in the direction of the length of the foot, a wedge-shaped intermediate portion for separating said front and back portions, each of said leg portions having two parts which are movable laterally toward and away from each other, a laterally-expansible foot provided with a wedge-shaped plate adapted to enter between the parts of the leg portions and thereby expand the same, said plate being movable rearwardly with respect to the foot, and means carried by said plate for expanding the foot when the plate moves rearwardly.

20. A shoe tree comprising a body portion, front and back leg portions pivotally connected thereto at their upper ends, a wedge-shaped intermediate portion and means for forcing the latter downward between the front and back portions and thereby separating the same, each of said leg portions being laterally expansible, and a foot provided with means for laterally expanding said leg portions.

21. A shoe tree comprising a body portion, front and back leg portions pivotally connected thereto at their upper ends, a wedge-shaped intermediate portion and means for forcing the latter downward between the front and back portions and thereby separating the same, each of said leg portions having two parts which are movable laterally toward and away from each other, and a detachable foot provided with a wedge-shaped plate adapted to enter between the parts of the several leg portions and thereby expand the same.

22. A shoe tree comprising a body portion, front and back leg portions pivotally connected thereto at their upper ends, a wedge-shaped intermediate portion and means for forcing the latter downward between the front and back leg portions and thereby separating the same, each of said leg portions having two parts which are movable laterally toward and away from each other, a detachable foot including an upper section and two lower sections carried thereby and pivotally connected to each other at the toe portion of the foot, whereby said lower sections are laterally expansible, a wedge-shaped plate adapted to enter between the parts of the several leg portions and thereby expand the same laterally, said plate being carried by the foot and movable rearwardly with respect to the same, means carried by said plate for expanding the lower foot sections when the plate moves rearwardly, and connections between said plate and back leg portion for moving the plate rearwardly when the intermediate leg portion is forced downward.

23. A shoe tree comprising an expansible leg, a detachable foot, and means operative with the expansion of the leg for locking the foot thereto.

24. A shoe tree comprising a leg having front and back portions arranged for separation in the direction of the length of the foot, means for separating the same, a detachable foot, and means carried thereby and separably connected to the rear portion of the leg for locking the foot to the leg when its front and back portions are separated.

25. A shoe tree comprising a leg having front and back portions arranged for separation in the direction of the length of the foot, means for separating the same, a detachable foot, a plate carried thereby, rearwardly-movable studs connecting the plate to the foot, and connections between said plate and the rear portion of the leg for moving the plate and studs rearwardly, the front portion of said leg being provided with apertures to receive said studs and thereby lock the foot to the leg.

In testimony whereof, I have hereunto subscribed my name this sixth day of August, 1915.

JEREMIAH F. COLLINS.

Witnesses:
E. D. CHADWICK,
JOSEPH T. BRENNAN.

Copies of this patent may be obtained for five cents each, by addressing the "Commissioner of Patents, Washington, D. C."